United States Patent Office 3,359,833
Patented Dec. 26, 1967

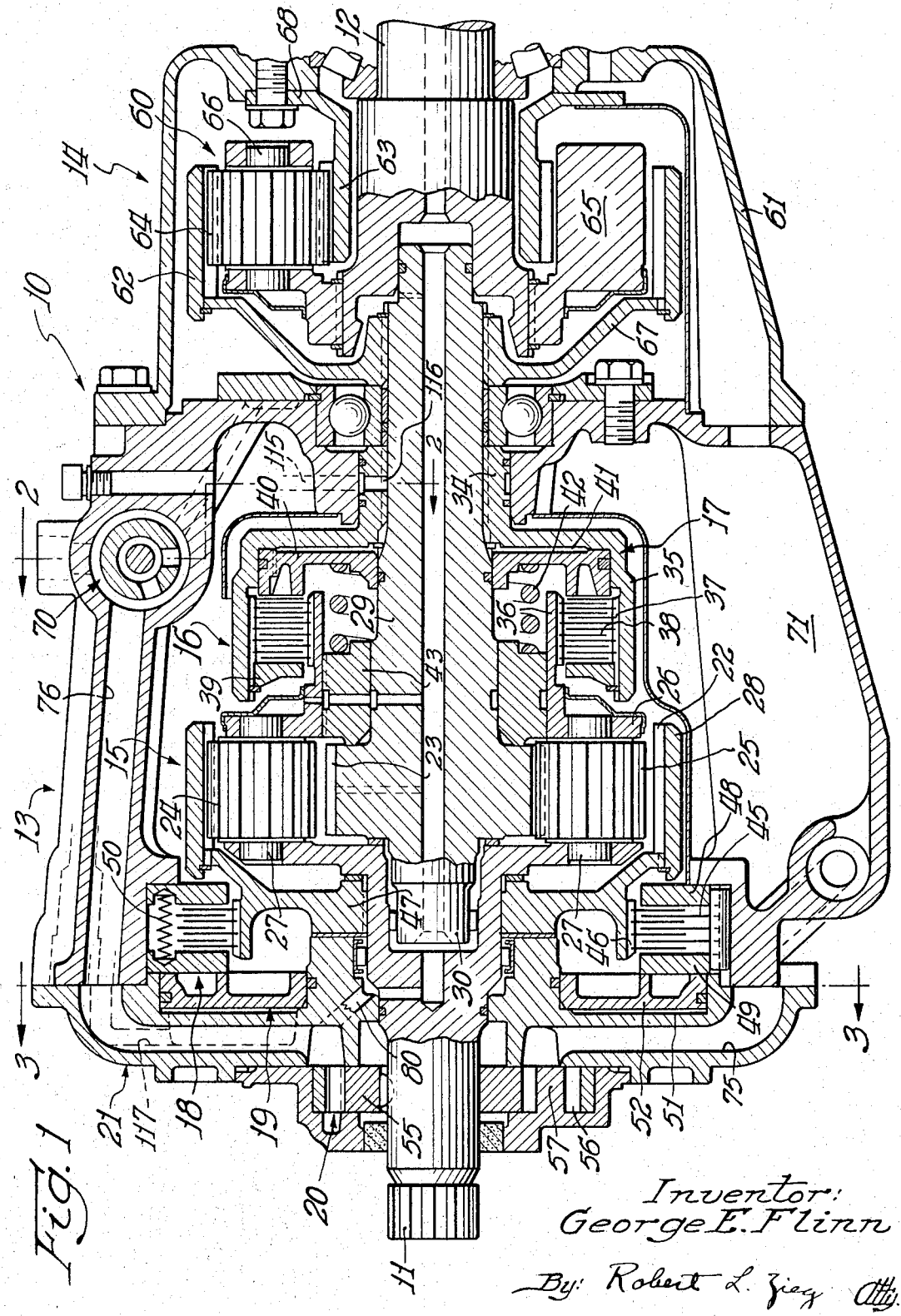

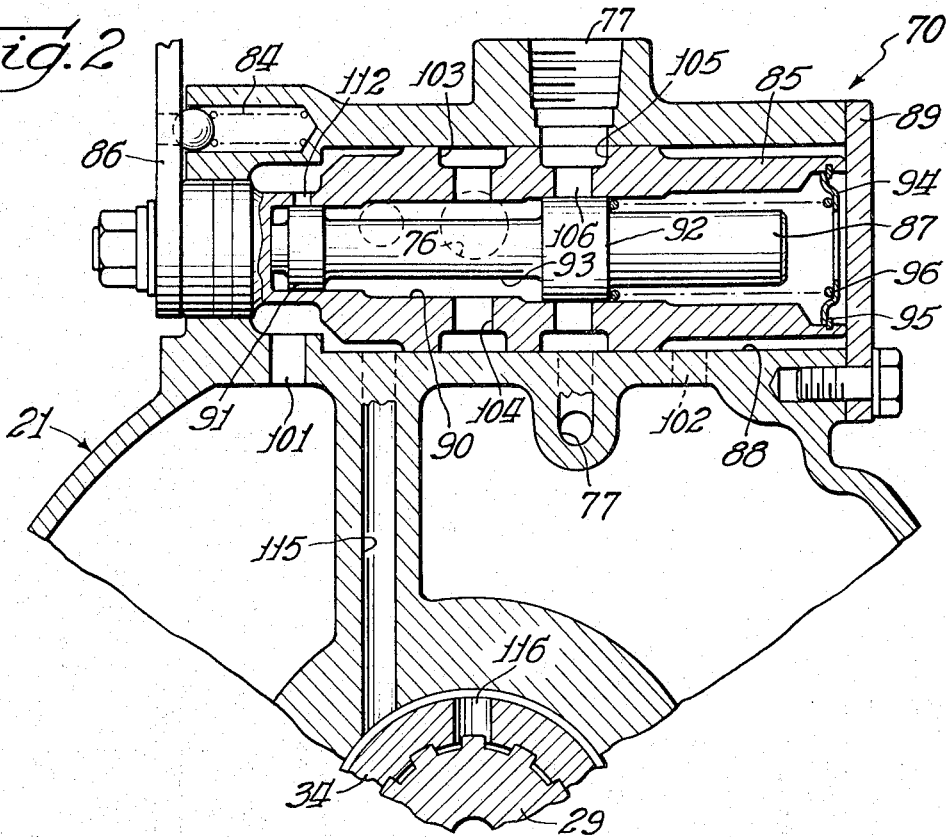
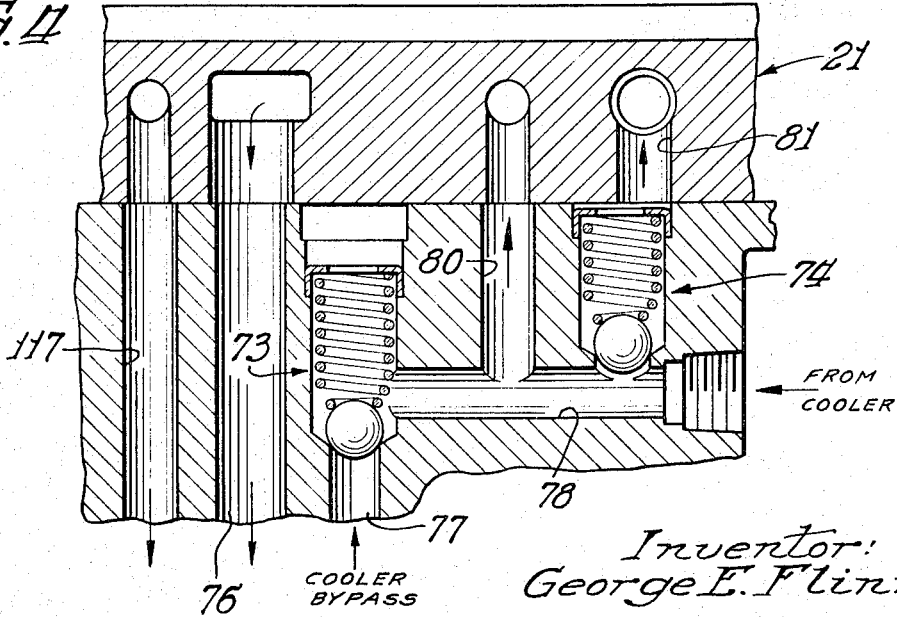

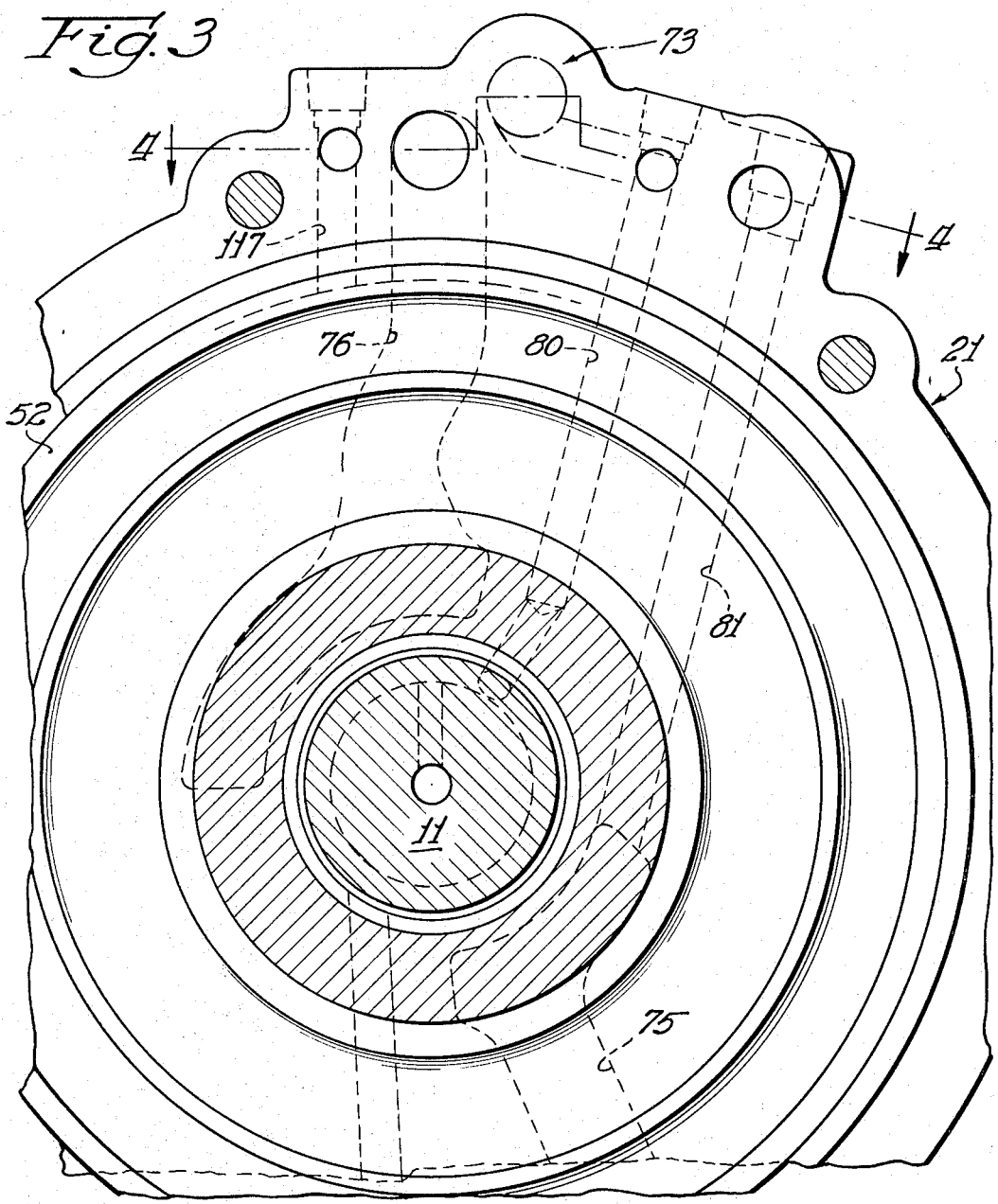

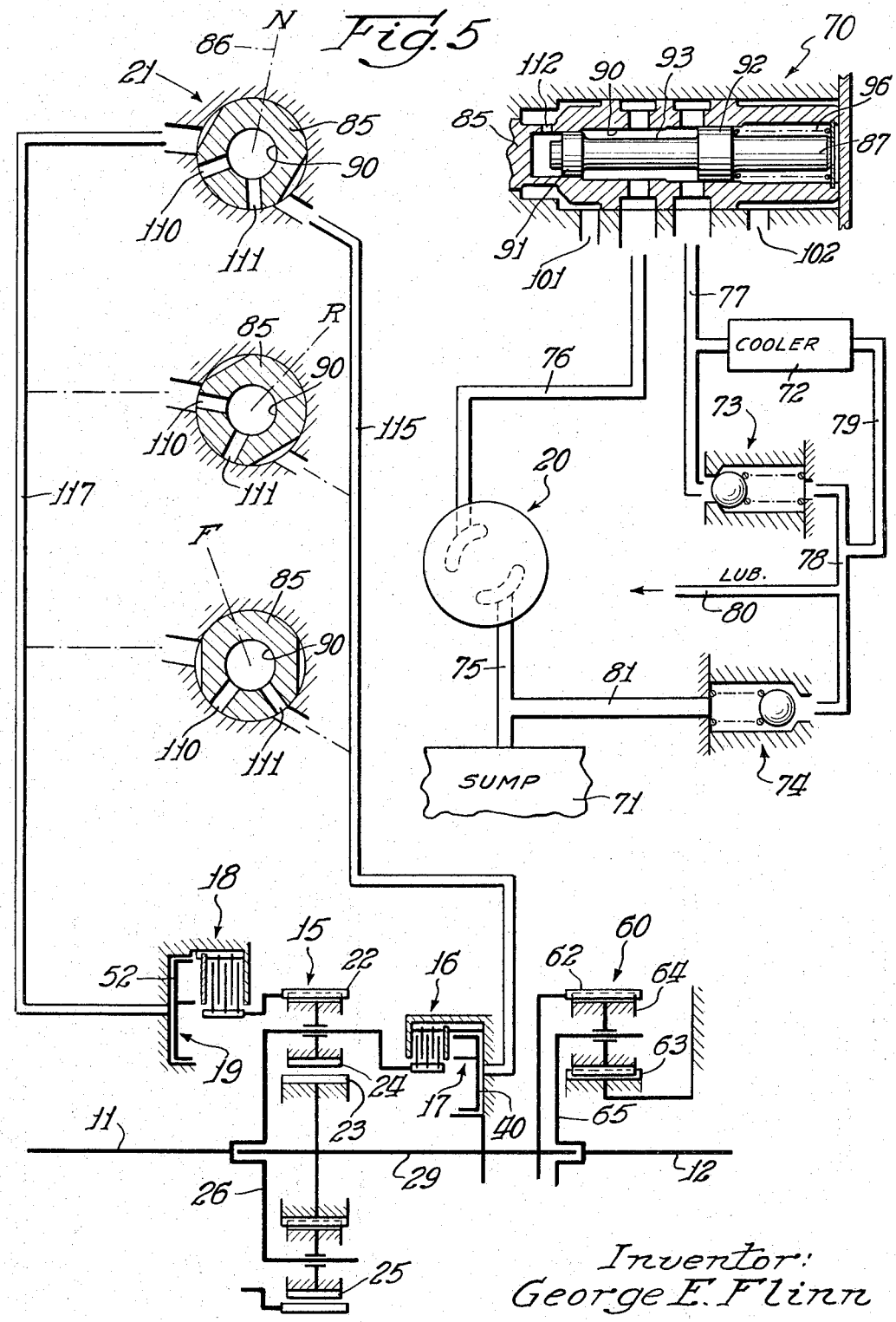

3,359,833
TRANSMISSION CONTROLS
George E. Flinn, Muncie, Ind., assignor to Borg-Warner Corporation, Chicago, Ill., a corporation of Illinois
Filed Nov. 25, 1964, Ser. No. 413,888
8 Claims. (Cl. 74—785)

This invention relates to transmissions and more particularly to control of the hydraulic type for such transmissions.

It is an object of the present invention to provide improved control of the hydraulic type for completing a forward drive power train or a reverse type power train through the transmission gearing unit.

It is an additional object to provide hydraulic controls for a transmission mechanism including an improved combination pressure relief valve and rotary selector valve to selectively condition the mechanism for forward drive condition, reverse drive condition or neutral condition.

It is another object of the invention to provide an improved combined pressure relief and rotary selector valve for the control system of a transmission incorporating a novel construction into the pressure relief valve which will prevent noise or buzzing of the relief valve by utilizing a fluid cushion to prevent the piston of the pressure relief valve from contacting the end of the valve body during the pressure regulation cycle.

The invention consists of the novel constructions, arrangements and devices to be hereinafter described and claimed for carrying out the above stated objects and such other objects as will be apparent from the following description of preferred forms of the invention illustrated with reference to the accompanying drawings wherein:

FIGURE 1 is a longitudinal sectional view of a transmission mechanism adapted to employ control mechanism embodying the principles of the invention;

FIGURE 2 is a sectional view taken on line 2—2 of FIGURE 1;

FIGURE 3 is a sectional view taken on line 3—3 of FIGURE 1;

FIGURE 4 is a sectional view taken along line 4—4 of FIGURE 3.

FIGURE 5 is a schematic illustration of the hydraulic control system for the transmission.

Referring to FIGURE 1, a transmission mechanism 10 is shown which includes a drive shaft 11, a driven shaft 12, a forward transmission unit 13 and a rear transmission unit 14. A drive shaft 11 is adapted to be connected to a driving engine and the driven shaft 12 is adapted to be connected to a propeller shaft (not shown).

The forward transmission unit 13 in general comprises a duplex planetary gear set 14, a multiple plate clutch 16, a hydraulic servomotor 17 for engaging the clutch 16, a reverse drive brake 18, a hydraulic servomotor 19 for engaging the brake 18 and a fluid pump 20 all enclosed within a transmission housing 21.

The duplex planetary gear set comprises a ring gear 22, a sun gear 23, a plurality of planet gears 24 and 25 and a planet gear carrier 26 formed on an enlarged portion of the drive shaft 11. The planet gears 24 and 25 are enmeshed with each other and are journalled on pins 27 mounted in the carrier 26. The planet gears 24 also are enmeshed with the ring gear 22 and the planet gears 25 are enmeshed with the sun gear 23. The ring gear 22 is formed in the interior of a drum 28 and the sun gear 23 is formed integrally with an intermediate shaft 29 journalled within the housing 21. An extended end portion 30 of the intermediate shaft 29 is piloted within the drive shaft 11.

The direct drive clutch 16 comprises an outer drum 35 and an inner drum 36 formed on an extension of the planetary carrier 26. The drum 35 is formed integrally with a clutch hub 34 which is splined to the intermediate shaft 29. A plurality of friction discs 37 are splined to the outer drum 35 and a plurality of friction discs 38 are splined to the inner drum 36 and interleaved with the discs 37. The friction discs 37 and 38 are sandwiched between a fixed end pressure plate 39 and a piston 40 slidably disposed within the drum 35. The hydraulic servomotor 17 includes the annular piston 40 disposed in a cavity 41 formed in the drum 35 and a return spring 42 which engages the piston 40 and a bearing member 43 disposed between the planetary carrier 26 and the intermediate shaft 29.

The reverse drive brake 18 comprises a plurality of friction discs 45 splined to the housing 21, a plurality of friction discs 46 are interleaved with friction discs 45 and are splined to a hub member 47 which is drivingly connected to the drum 28 by splines. The hub member 47 is rotatably journalled on drive shaft 11. The brake 18 also includes a fixed pressure plate 48 engaged with the housing 21 and a movable pressure plate 49 slidably disposed in housing 21. The pressure plates 48 and 49 are urged apart by a plurality of return springs 50.

The servomotor 19, for engaging the reverse drive brake 18, comprises a cavity 51 formed within the housing 21 in which an annular piston 52 is slidably disposed. The piston 52 is in engagement with the movable pressure plate 49 of the brake 18.

The fluid pump comprises an inner gear 55 splined to the drive shaft 11, an outer gear 56 in mesh with and eccentrically disposed with respect to the gear 55, and a lunar shaped member 57 fixedly disposed between the eccentric gears 55 and 56.

The rear transmission unit 14 in general comprises the planetary gear set 60, and a housing 61 which is secured to the housing 21 by bolts illustrated in the drawing.

The planetary gear set 60 comprises a ring gear 62, a sun gear 63, a plurality of planet gears 64 and a planet gear carrier 65. The planet gears 64 are in mesh with the sun gear 63 and ring gear 62 and are journalled on pins 66 mounted in the planet gear carrier 65. The ring gear 62 is splined to and supported by the intermediate shaft 29 to be driven thereby by means of an annular member 67. The sun gear 63 is formed on the hub 68 which is secured to the housing 61. The planet gear carrier 65 is splined to the output shaft and is adapted to drive the output shaft.

The transmission mechanism 10 may have a neutral condition, a forward drive condition and a reverse drive condition.

Neutral condition is obtained when both the clutch 16 and the brake 18 are disengaged. In this condition driving torque from the engine drives the drive shaft 11 and the planet gear carrier 26 of the gear set 15. These is no reaction member for the gear set in this condition and thus there is no driving torque applied to the rear transmission unit 14 or to the driven shaft 12.

Forward drive condition is obtained when the clutch 16 is engaged and the brake 18 is disengaged; the clutch 16 is engaged by supplying fluid under pressure to the servomotor 17 which causes the piston 40 to move to the left as shown in FIGURE 1 and press the friction discs 37 and 38 into engagement. Engagement of the clutch 16 locks together the planet gear carrier 26 and the sun gear 23 so that the gear set 15 thereafter is caused to rotate as a unit and drive the intermediate shaft 29 at a 1–1 speed ratio with respect to the drive shaft 11.

The intermediate shaft 29 drives the ring gear 62 of the planetary gear set 60 in a forward direction and at the same speed as the drive shaft 11. The sun gear 63 serves as a permanently fixed reaction member for the gear set 60 and the planet gears 64 are driven by the ring gear 62 and drive the planet gear carrier 65 at a reduced speed gear ratio in the forward direction with respect to ring gear 62.

Reverse drive condition is obtained when the brake 18 is engaged and the clutch 16 is disengaged. The brake 18 is engaged by supplying fluid under pressure to the servomotor 19 so as to cause the piston 52 to move to the right as shown in FIGURE 1. Piston 52 acts against the pressure plate 49 which in turn presses the friction discs 45 and 46 into engagement with the stationary pressure plate 48. Engaged brake 18 functions to hold stationary the ring gear 22 of the gear set 15. In this condition the forwardly rotating drive shaft 11 and the planetary gear carrier 26 with the ring gear 22 acting as the reaction member, will drive the sun gear 23 in the reverse direction. Thus the intermediate shaft 29 is driven in the reverse direction as is the driven shaft 12 through the planetary gear set 60 at a fixed gear reduction ratio as previously described for forward drive condition.

It is contemplated that the forward transmission unit 13 can be utilized independently from the rear transmission unit 14; for such application the intermediate shaft 29 would be connected to the output or propeller shaft. The operation of the forward transmission unit 13 would be identical to that described, with the exception of the reduced gear ratio provided by the planetary gear set 60.

Fluid pressure operating the hydraulic servomotors 17 and 19 is obtained from the pump 20 and is supplied to the servomotors 17 and 19 through suitable valving and conduit means as will now be described.

As illustrated in FIGURES 1, 2 and 5 the hydraulic control system for the transmission includes a combined rotary selector and relief valve 70.

In FIGURE 5 the connections between the valve 70 and the other elements of the control circuit are illustrated. Included in the fluid circuit for the transmission is a sump 71, pump 20, valve 70, a fluid cooler 72, a high pressure check valve 73, and a low pressure check valve 74.

The fluid pump 20 is connected to the sump by an inlet passage 75. The pump supplies pressure to an outlet conduit 76 interconnecting the pump 20 and the valve 70. The valve 70 is connected to the cooler 72 and the check valve 73 by a conduit 77. A conduit 78 connects the outlet side of check valve 73 to the inlet side of check valve 74. A conduit 79 connects the outlet side of the cooler 72 to the conduit 78. Also connected to the conduit 78 is conduit 80 which supplies fluid to the various lubricating conduits throughout the transmission. A conduit 81 connects the outlet side of check valve 74 to the pump inlet passage 75.

Referring to FIGURES 2 and 5, the combined rotary selector and relief valve 70 includes a rotatably sleeve 85, an operating handle 86 drivingly connected to the sleeve 85, and a piston 87. A detent mechanism 84 is provided to hold the operating handle in its selected position. The sleeve 85 is located within a bore 88 provided in the housing 21 and enclosed on one end by a plate 89.

The piston 87 is slidable in a bore 90 provided in the sleeve 85. The bore 90 is closed on the left end and open on the right end as viewed in FIGURE 2. The piston 87 includes lands 91 and 92 separated by a groove 93. A thrust member 94 is located in the right or open end of bore 90 and is held in place by a snap ring 95. A spring 96 is provided which engages thrust member 94 and land 92 on the valve piston 87 and urges the piston to the left as illustrated in FIGURE 2.

The bore in the housing 21 includes exhaust ports 101 and 102. The sleeve 85 is provided with a groove 103 and bores 104 connecting the bore 90 to the high pressure or outlet conduit 76. The sleeve 85 also has a groove 105 and bores 106 connecting the bore 90 to the conduit 77. The sleeve 85 is also provided with bores 110 and 111 which serve to connect the bore 90 with either brake 18 or clutch 16 as will later be described.

A bore or fluid outlet means 112 is provided in the sleeve 85 in the upper part of the sleeve as viewed in FIGURE 2. The bore 112 is one of the novel and important parts of the present invention and has a critical location with respect to piston 87. The bore 112 serves to prevent the valve piston 87 from hitting the left end of the bore 90 in the sleeve 85 to prevent valve noise or buzz during the pressure regulating movements of the piston 87, as will later be more particularly described.

A fluid passage 115 is provided in the housing 21 which connects valve 70 to the clutch 16 through a relieved area in the hub 34 for the clutch drum 35 as indicated at 116. A fluid passage 117 is provided in the housing 21 which connects the valve 70 to the servomotor 19 for the brake 18.

FIGURES 3 and 4 of the drawings illustrate the locations of the fluid conduits described within the housing 21.

The operation of the fluid control circuit for the transmission is as follows:

As schematically illustrated in FIGURE 5 the operating handle and sleeve 85 have three positions: forward, neutral and reverse represented by F, N and R in the drawing.

The fluid pump 20 supplies fluid pressure to bore 90 of the valve 70. Pressure in the bore 90 and groove 93 will act on the differential area between lands 91 and 92 to move the piston 87 to the right against the force of the spring 96. Fluid pressure can then flow into conduit 77 leading to the cooler and lubrication and the pressure in bore 90 will thus be relieved. The piston 87 will thus regulate the fluid pressure to some desired value in dependence upon the relative sizes of the lands 91 and 92 and the size of the spring 86.

Fluid flowing into conduit 77 from the valve 70 will flow through the cooler 72 and into conduit 79. If the pressure of the fluid in the conduit 77 exceeds the pressure setting of the check valve 73 (the setting for a preferred embodiment of the transmission would be approximately 59 p.s.i.) the check valve 73 will open and fluid will flow into conduit 78 through the check valve 73, bypassing the cooler 72. The bypass is provided as a safety feature to insure that adequate fluid will be returned to the sump if the cooler becomes clogged or becomes inadequate to handle the amount of fluid flowing into conduit 77. Fluid in the conduit 78 will then flow through the check valve 74 (which for a preferred embodiment of the invention would be set at approximately 15 p.s.i.) and into conduit 81 and the fluid inlet passage 75 to the pump or to the sump. Thus, a minimum pressure of 15 p.s.i. will be maintained in the lubrication conduit 80 to insure that the various parts of the transmission will receive lubricating fluid.

As illustrated in FIGURE 5, when the sleeve 85 is in the "N" or neutral position bores 110 and 111 are blocked by the housing 21 and the fluid pressure is confined to bore 90. Thus none of the friction elements are applied and the transmission is in neutral.

When the sleeve 85 is in the "R" position as illustrated in FIGURE 5, fluid pressure in bore 90 will be communicated to the fluid passage 117 through bore 110, applying the brake 18 and the transmission will be conditioned for reverse drive ratio.

When the sleeve 85 is in the "F" position as illustrated in FIGURE 5, fluid pressure in bore 90 will be communicated to conduit 115 through bore 111, applying the clutch 16 and conditioning the transmission for forward drive ratio.

As above explained, the piston 87 by means of the differential area of lands 91 and 92 acts to regulate the fluid pressure supplied by the pump 20 before it is communicated to the friction elements. At times the piston 87 of the regulating valve will be reciprocating back and forth rather rapidly due to fluctuations in pump pressure supplied to the regulating valve and pressure requirements of the friction elements. One of the problems which occurs with fluid pressure regulating valves of the type described is that the rapid reciprocating movement can produce a disturbing valve buzz or noise due to the fact that the valve piston will be striking the end of the valve chamber during the pressure regulation function. This valve noise will occur with the pressure regulating valve of the type described as piston 87 striking the left end of the bore 90 during its regulation function.

A bore 112 has been included in the sleeve to eliminate the valve buzz and noise and quiet the valve 70 as the pressure is regulated. During the pressure regulation cycle a certain amount of fluid will leak by land 91 from the groove 93 and into the bore 90 on the left side of land 91. In known valves of the type described an exhaust port would be provided at the bottom of the valve sleeve 85 to drain this fluid leaking by land 91 to the sump. Applicant's new and improved regulating valve includes bore 112 which is located at the top of sleeve 85. With the bore 112 so located, as shown in FIGURE 2, when the piston 87 moves to the left during its regulation function the fluid which has leaked by land 91 will be trapped in the left or closed end of the bore 90 on the left side of land 91. A certain part of the fluid may be forced out through bore 112 as piston 87 moves to the left but as the land 91 moves to a position where bore 112 is completely blocked, as is illustrated in FIGURE 2, the fluid is completely confined within the left end of bore 90 and left side of land 91 and provides a fluid cushion preventing the valve piston 87 from striking the end of the sleeve 85.

Thus, due to the location of the bore 112 and the land 91 on the piston 87, the piston 87 is prevented from moving all the way to the left into engagement with sleeve 85 at the end of bore 90 by a fluid cushion and the valve buzz or noise is eliminated.

By provision of the bore 112 and its location, applicant has provided a simple and effective means of eliminating a noise problem within a pressure regulating valve. The solution utilizes the effective cushioning and dampening action of trapped fluid to prevent the regulating valve piston from contacting the casing in which it is housed and thereby quiet the regulating valve.

It will be apparent that the applicant's novel and simple structure for preventing valve buzz in a regulating valve by means of a properly located bore at the top of the valve body which can be blocked by a valve land to trap fluid, can be used in regulating valves of other types as commonly used in automatic and other transmissions. The invention can also readily be utilized in other fluid pressure supplying applications where a regulating function is performed as well as in the structure illustrated in the drawings.

It is to be understood that the invention is not to be limited to specific constructions and arrangements as shown and described except only insofar as the claims may be so limited as it will be understood to those skilled in the art that changes may be made without departing from the principles of the invention.

I claim:

1. In a fluid supply and regulating system a source of fluid pressure, a regulating valve connected to said source and adapted to regulate said fluid pressure, said regulating valve including a sleeve member having a closed end, a piston slidably mounted for movement within said sleeve member, said piston including a differential land area thereon exposed to fluid pressure from the source and thereby urging said piston in one direction, means yieldably urging said piston in the opposite direction, means operative in response to movement of said piston to regulate said fluid pressure, fluid outlet means in said sleeve member, said piston being adapted to block said outlet means to trap fluid within said closed end and prevent said piston from contacting said closed end to quiet said valve as said piston moves and said fluid pressure is regulated.

2. In a fluid supply and regulating system, a source of fluid pressure, a regulating valve connected to said source and adapted to regulate said fluid pressure, said regulating valve including a sleeve member having a closed end, a piston slidably mounted within said sleeve member, said piston including a differential land area thereon exposed to fluid pressure from the source and thereby urging said piston in one direction, means yieldably urging said piston in the opposite direction, means operative in response to movement of said piston and movable to regulate said fluid pressure, fluid outlet means in said sleeve member, said piston being adapted to block said fluid outlet means as it moves toward said closed end to trap fluid within said closed end to prevent said piston from contacting said closed end and thereby quiet said regulating valve as said piston is moving to regulate fluid pressure.

3. In a fluid supply and regulating system, a source of fluid pressure, a regulating valve connected to said source and adapted to regulate said fluid pressure, said regulating valve including a sleeve member having a closed end, a piston slidably mounted within said sleeve member, said piston including a differential land area thereon exposed to fluid pressure from the source and thereby urging said piston in one direction, means yieldably urging said piston in the opposite direction, means operative in response to movement of said piston and movable therein to regulate said fluid pressure, a bore in said sleeve member near said closed end, said bore normally being open to allow fluid to pass therethrough from said closed end, said piston serving to block said bore to trap fluid within said closed end when said piston is moving toward said closed end as the fluid pressure is being regulated and to thereby trap fluid within said closed end and prevent said piston from contacting said closed end to quiet said regulating valve as said piston is moving and the fluid pressure is being regulated.

4. In a transmission mechanism an input shaft, an output shaft, gearing interconnecting said shafts, a plurality of fluid pressure actuatable devices adapted to be selectively actuated to establish different drive ratios between said shafts, a source of fluid pressure, a regulating valve connected to said source of fluid pressure and to said devices, said regulating valve being adapted to regulate the fluid pressure from said source, said regulating valve including a sleeve member having a closed end, a piston slidably mounted for movement within said sleeve member, said piston including a differential land area thereon exposed to fluid pressure from the source and thereby urging said piston in one direction, means yieldably urging said piston in the opposite direction, means operative in response to movement of said piston to regulate said fluid pressure, said sleeve member including means to trap fluid in said closed end and prevent said piston from contacting said closed end and thereby quiet said regulating valve said piston moves and the fluid pressure is regulated.

5. In a transmission mechanism an input shaft, an output shaft, gearing interconnecting said shafts, a plurality of fluid pressure actuatable devices adapted to be selectively actuated to establish different drive ratios between said shafts, a source of fluid pressure, a regulating valve connected to said source of fluid pressure and to said devices, said regulating valve being adapted to regulate the fluid pressure from said source, said regulating valve including a sleeve member having a closed end, a piston slidably mounted for movement within said sleeve member, said piston including a differential land area thereon exposed to fluid pressure from the source and thereby urging said piston in one direction, means yieldably urging said piston in the opposite direction, means operative in response to movement of said piston to regulate said fluid pressure, fluid outlet means in said sleeve member, said piston being adapted to block said outlet means to trap fluid within said closed end and prevent said piston from contacting said closed end and thereby quiet said regulating valve as said piston moves and the fluid pressure is regulated.

6. In a transmission mechanism the combination of a drive shaft, a driven shaft, gearing interconnecting said shafts, a plurality of fluid actuatable devices selectively actuatable to establish different drive trains between said shafts, a source of fluid pressure, a selector valve connected to said source of pressure and said devices and adapted to selectively actuate said devices, said selector valve including means to regulate the fluid pressure from said source, said means including a sleeve member having a closed end, a piston slidably mounted for movement within said sleeve member, means operative in response to movement of said piston to regulate said fluid pressure, said sleeve member including means to trap fluid in said closed end and prevent said piston from contacting said closed end to quiet said regulating means as said fluid pressure is regulated.

7. In a transmission mechanism the combination of a drive shaft, a driven shaft, gearing interconnecting said shafts, a plurality of fluid actuatable devices selectively actuatable to establish different drive trains between said shafts, a source of fluid pressure, a selector valve connected to said source of pressure and said devices adapted to selectively actuate said devices, said valve including means to regulate the fluid pressure from said source, said means including a sleeve member having a closed end, a piston slidably mounted for movement within said sleeve member, means operative in response to movement of said piston to regulate said fluid pressure, fluid outlet means to trap fluid within said closed end and prevent said piston from contacting said closed end to quiet said regulating means as said fluid pressure is regulated.

8. In a transmission mechanism, the combination of a drive shaft, a driven shaft, gearing interconnecting said shafts, a plurality of fluid actuatable devices selectively actuatable to establish different drive trains between said shafts, a source of fluid pressure, a selector valve connected to said source of pressure and said devices adapted to selectively actuate said devices, said selector valve including means to regulate the fluid pressure from said source, said means including a sleeve member having a closed end, a piston slidably mounted within said sleeve member, means operative in response to movement of said piston and movable therein to regulate said fluid pressure, said piston having a pair of lands of different area thereon, a bore located in said sleeve member said bore normally being open to allow fluid to pass therethrough from said closed end, one of said lands on said piston being adapted to block said bore to trap fluid within said closed end and prevent said piston from contacting said closed end when said piston is moving toward said closed end as the fluid pressure is being regulated and to thereby quiet said regulating means as said fluid pressure is being regulated.

References Cited
UNITED STATES PATENTS

| | | | |
|---|---|---|---|
| 632,490 | 9/1899 | Hemphill | 137—514.7 |
| 940,385 | 11/1909 | Folco | 137—514 |
| 956,789 | 5/1910 | Allan | 137—514 |
| 1,258,167 | 3/1918 | Vollmann | 137—514.7 |
| 1,322,930 | 11/1919 | Parker | 137—514.7 |
| 1,572,507 | 2/1926 | Robert | 137—514.7 |
| 1,599,716 | 9/1926 | Replogle | 137—514.3 |
| 2,388,406 | 11/1945 | Haberland | 137—514.7 |
| 2,600,875 | 6/1952 | Hrdlicka | 137—514.5 |
| 2,737,196 | 3/1956 | Eames | 137—115 X |
| 2,877,668 | 3/1959 | Kelbel | 74—788 |
| 3,007,481 | 11/1961 | Frost | 137—116 |
| 3,115,049 | 12/1963 | Moan | 74—472 |

DONLEY J. STOCKING, *Primary Examiner.*

DAVID J. WILLIAMOWSKY, *Examiner.*

J. R. BENEFIEL, *Assistant Examiner.*